United States Patent [19]

Walsh

[11] Patent Number: 5,565,136
[45] Date of Patent: Oct. 15, 1996

[54] WATER BASED WOOD STRIPPING COMPOSITIONS

[75] Inventor: William C. Walsh, Archbold, Ohio

[73] Assignee: BASF Corporation, Mount Olive, N.J.

[21] Appl. No.: 253,595

[22] Filed: Jun. 3, 1994

Related U.S. Application Data

[63] Continuation of Ser. No. 38,183, Mar. 29, 1993, abandoned, which is a continuation of Ser. No. 771,894, Oct. 7, 1991, abandoned, which is a continuation of Ser. No. 650,816, Feb. 4, 1991, abandoned, which is a continuation of Ser. No. 322,760, Mar. 13, 1989, abandoned.

[51] Int. Cl.$^6$ ......................................................... C11D 7/50
[52] U.S. Cl. ......................... 510/203; 510/206; 510/212; 510/418
[58] Field of Search ..................... 252/162, 153, 252/170, 171, 542, DIG. 8, 173, 138; 134/38; 55/85, 89

[56] References Cited

U.S. PATENT DOCUMENTS

| | | | |
|---|---|---|---|
| 4,927,556 | 5/1990 | Pokorny | 252/173 |
| 5,006,279 | 4/1991 | Grobbel et al. | 252/542 |
| 5,015,410 | 5/1991 | Sullivan | 252/166 |

*Primary Examiner*—Mark L. Bell
*Assistant Examiner*—Scott L. Hertzog
*Attorney, Agent, or Firm*—Joanne P. Will

[57] ABSTRACT

This invention relates to water-based coating remover compositions comprising a substantially stable and homogeneous mixture of (a) from about 16 to about 55 percent by weight of N-methyl-2-pyrrolidone; (b) from about 11 to about 32 percent by weight of a dibasic ester; (c) from about 4 to about 20 percent by weight of a propylene glycol or glycol ether; (d) an effective amount of a hydroxypropyl cellulose thickener; and (e) from about 25 to about 65 percent by weight water. Exemplary dibasic esters useful in the present invention include at least one $C_{1-4}$ dialkyl ester of at least one $C_{4-6}$ aliphatic dibasic acid. Suitable glycol ethers include propylene glycol, propylene glycol oligomers or monoalkyl ether of monophenyl ether derivatives of said glycols and oligomers.

20 Claims, No Drawings

WATER BASED WOOD STRIPPING COMPOSITIONS

This is a continuation application of Ser. No. 08/038,183, filed Mar. 29, 1993, (now abandoned) which in turn is a continuation of Ser. No. 07/771,894, filed Oct. 7, 1991, (now abandoned) which in turn is a continuation of Ser. No. 07/650,816, filed Feb. 4, 1991, (now abandoned) which in turn is a continuation of Ser. No. 07/322,760, filed Mar. 13, 1989, (now abandoned).

BACKGROUND OF THE INVENTION

1. Field of the Invention

The present invention relates to water-based coating remover compositions, and concentrates from which said compositions are made for removing coatings from wood substrates.

2. Description of Relevant Art

The removal or stripping of paint, varnish, lacquer and other coatings or finishes from a surface is generally very complex presenting a variety of problems to those in the art. Factors which influence a particular stripping operation include: the type of coating(s); thickness of the coating(s); type of substrate the coating is on; whether a primer was used and if so the type and thickness of primer; the type of pigment; the curing time, temperature and method; and the age of the coating.

As paint and other coating formulations improve, it becomes increasingly difficult to remove these coatings from a variety of surfaces and in a variety of situations. Such situations range from large industrial operations to a hobbyist refinishing a piece of furniture. The coatings to be removed range from old oil-based paints to highly polymerized modern coating materials which, by design, are increasingly resistant to chemical removers. Desirable properties and characteristics for a coatings remover includes: stripping ability (effectiveness); be noncorrosive to the substrate; will not promote galvanic attack at the juncture of different metals; free of noxious and toxic chemicals; good shelf life; low volatility; leave a substrate ready for further processing; and be low in cost.

The Known coating removers used for removing coatings from wood substrates contain large percentages of methylene chloride and/or highly flammable solvents, or are caustic or acid solutions. Products currently used by professionals do not lend themselves to relatively safe use by the general public. Although substantially the same disadvantages are encountered by both professionals and the general public, these disadvantages are more acute with respect to the general public. Such disadvantages include toxicity, flammability, volatility, non- or inadequate biodegradeability and difficult to apply and/or remove.

Alternative constituents to methylene chloride, particularly in formulations intended for consumer (general public) purchase, typically increase the cost to such an extent that such formulations cannot effectively compete with methylene chloride containing formulations.

A non-methylene chloride containing paint stripper is disclosed in U.S. Pat. No. 4,666,626 which generally discloses a non-methylene chloride paint stripper composition containing oxo-hexyl acetate as the chief cleaning agent in combination with cyclohexanone. The compositions preferably also contain furfuryl alcohol, an aromatic naptha solvent, methyl cellulose thickener, dodecyl benzene sulfonate, N-methyl-2-pyrrolidone, diisobutyl ketone and sodium xylene sulfonate. It is also stated the composition readily emulsifies with water and is removable by water.

Although N-methyl-2-pyrrolidone is known for use primarily as an activator or cosolvent in certain paint, varnish and other coating removers, it is also known for use as an active solvent in some coating remover formulations.

In U.S. Pat. No. 4,120,810, a paint remover composition consisting of a mixture of 15–60 mole percent NMP and 35 or more mole percent of an aromatic hydrocarbon solvent consisting of a mixture of aromatic hydrocarbons having more than 6 carbon atoms is disclosed. Also disclosed as optional ingredients are high flash point glycol ethers (up to 50 mole percent), from one to six percent of a cellulose thickener, and a surfactant to improve water washability. Although effective as a paint remover, stripping formulations based on this reference present certain disadvantages. Commercially available formulations did not rinse well with water leaving behind a white haze on the substrate believed to be precipitated thickener. The cost of these formulations is high particularly when compared to methylene chloride based removers. There is a high volatile organic material content to these formulations which causes environmental concerns particularly regarding disposal of spent remover. The disclosure states that water should not be used as a constituent of those formulations.

In U.S. Pat. No. 2,918,443, a solvent for use in applying resins consisting of copolymers of vinyl chloride and vinyl acetate in certain proportions is described, said solvent consisting of 7 to 95 percent by weight N-aliphatic hydrocarbon substituted derivatives of 2-pyrrolidone having no more than four carbon atoms in the aliphatic carbon group and a liquid mono nuclear aromatic hydrocarbon. There is no disclosure or suggestion of several of the constituents of the present concentrate or water-based formulation or that such constituents could be used to afford a stable water-based coating remover composition.

In U.S. Pat. No. 4,085,059, a liquid coating remover, particularly for polyamide epoxy resin type coatings, adapted for forming a relatively stable foam is disclosed. This coating remover consists of 5–35 percent by weight N-methyl-2-pyrrolidone (NMP), 10–35 percent by weight water-soluble organic surfactant blend capable of emulsifying a gas, and 30–85 percent by weight water. The surfactant blend is said to consist of a mixture of 5–15 percent by weight $C_6$–$C_{18}$ fatty acid material, 3–10 percent by weight alkylolamines and 5–15 percent by weight polyhydric alcohols, all amounts based on the total weight of the composition. Applicant's invention includes constituents which are not disclosed or suggested by this reference. Unlike the present invention, the reference uses a blend of at least three surfactants and is adapted to form an emulsion with a gas; that is a foam.

In *M-Pyrol Bankbook*, GAF Corporation, 1972, pages 51–52, discloses two paint remover formulations that include N-methyl-2-pyrrolidone. The first formulation includes NMP at 56.5 parts by weight and methylene chloride at 30 parts by weight along with a particular anionic surfactant at 10 parts by weight, paraffin wax at 1.5 parts by weight and Methocell® HG (hydroxypropyl methylcellulose thickener commercially available from the Dow Chemical Company) at 2.0 parts by weight. The present invention does not include methylene chloride or paraffin wax and does include other constituents.

The second formulation consists of NMP at 98.5 parts by weight, di-2-ethylhexylamine at 0.75 parts by weight and Carbopol® 934 resin (commercially available from B. F.

Goodrich Chemical Co.). The high cost of such a formulation because of the large NMP concentration renders such a formulation quite unattractive.

A brochure available from The Dow Chemical Company entitled METHOCELL 311 Cellulose Ether (form no. 192-1040-87) described viscosification properties of METHOCELL 311 (commercially available from the Dow Chemical Company) in various methylene chloride/alcohol systems. It also described viscosification properties of METHOCELL 311 in four non-methylene chloride paint stripper formulations. All formulations include toluene at 23.5 percent by weight, methyl alcohol at 19.0 percent by weight and METHOCELL 311 at 1.0 percent by weight. Test formulation 1 includes NMP at 55 percent by weight. Test formulation 2 includes acetophenone at 55 percent by weight. Test formulation 3 includes tripropylene glycol monomethyl ether at 55 percent by weight. Test formulation 4 includes a mixture of tripropylene glycol monomethyl ether and acetophenone, each at 27.5 percent by weight. All of these formulations require the presence of methyl alcohol which is undesirable due to its toxic effects on humans.

In U.S. Pat. No. 4,780,235 a low toxicity paint remover composition is disclosed consisting of at least 20 percent by weight of at least one $C_1-C_4$ dialkyl ester of a $C_4-C_6$ aliphatic dibasic acid; 0.1 to 5 percent by weight of an activator, an effective amount of a thickener; an effective amount of a compatible surfactant; and from 1 to 80 percent by weight of at least one nonhalogen-containing organic solvent. The present invention does not include an activator, more particularly the basic or acidic activators described in the patent. Further, the surfactant is said to be present to enhance the water wash of the substrate. There is no suggestion regarding water-based coating remover compositions.

Despite the above and other alternatives to methylene chloride type removers, there continues to be a need for coating removers having equivalent or improved performance to the known removers at lower cost.

Accordingly, one object of the present invention is to provide a coating remover composition, particularly for coatings of the type used on wood substrates such as lacquers, varnishes, enamels, latex and one part moisture cure urethanes, that is of reduced toxicity.

Another object is to provide a coating remover that is composed of high flash point constituents and exhibits low skin irritation.

A further object is to provide a coating remover having reduced volatile organic material content while being effective and has a good shelf life.

Still a further objective is to provide a coating remover that does not raise the grain of wood substrates during use and which allows equipment to be cleaned with water, following use.

SUMMARY OF THE INVENTION

It has unexpectedly been found that an effective, substantially stable, clear coating composition remover for wood substrates can be prepared having water as a major constituent. The coating remover of the present invention is prepared from a concentrate that affords an effective, safe, substantially stable homogenous water-based composition when admixed with water, said water-based composition comprising:

(A) from about 16 to about 55 percent by weight of N-methyl-2-pyrrolidone; and (B) from about 11 to about 32 percent by weight of dibasic ester; and (C) from about 4 to about 20 percent by weight of a propylene glycol or glycol ether; and (D) an effective amount of a hydroxypropyl cellulose thickener; and (E) from about 25 to about 65 percent by weight of water, where the percentages by weight are based on the total weight of the composition.

The present invention also includes a concentrate comprising constituents (A) through (D) in the same relative proportions and ranges with respect to each other as defined above and from about 0 to less than about 25 percent by weight of water.

DETAILED DESCRIPTION OF THE INVENTION

In accordance with one aspect of the present invention, an effective, safe, substantially stable, homogenous, water-based coating remover composition can be obtained by blending water with a coating remover concentrate comprised of a homogenous thickened mixture of three different active solvents. Activators including basic type such as ammonium hydroxide and monoethanol amine, and acidic type such as formic acid, acetic acid and oxalic acid are not necessary and preferably not included in the compositions of the present invention.

The water-based coating remover of the present invention is useful for removing various cured and uncured paints, varnishes, lacquers and other coatings or finishes, particularly coatings used on wood such as acrylic latex type enamel, polyurethane based clear protective coatings, oil-based alkyl resin, epoxy paint and varnish/lacquer.

The water-based coating remover of the present invention can be used for removing paint, lacquers, varnishes and other coatings or finishes from a variety of substrates, including paint brushes, without significant damage, such as etching, pitting or corrosion to such substrate. Examples of substrates on which the coating remover of the present invention can be used includes: wood; glass; acrylic type plastics; concrete; and various metals such as aluminum, galvanized steel, stainless steel and automotive grade and quality steels. The coating remover of the present invention is particularly effective for removing coatings from wood.

Because the coating remover of the present invention is a water-based formulation, it is readily removed from a substrate by a stream of water, even after stripping one or more coatings from said substrate. Of course, with wood substrates, the stripping compositions of the present invention are preferably removed with a clean cloth or a clean damp cloth to avoid raising the grain of the wood substrate. The water-based remover compositions of the present invention are applied by conventional means such as brushing, spraying, or, where practical, can be used as an immersion bath.

Generally, the coating remover composition of the present invention, comprises a substantially homogenous mixture of from about 16 to about 55 percent by weight of N-methyl-2-pyrrolidone (NMP), from about 11 to about 32 percent by weight of dibasic ester, from about 4 to about 20 percent by weight of a propylene glycol or glycol ether, an effective amount of a hydroxypropyl cellulose thickener, and from about 25 to about 65 percent by weight of water. The above percentages by weight are based on the total weight of the composition.

As stated above, generally from about 16 to about 55 percent by weight of NMP is used in the composition of the present invention, preferably from about 20 to about 45 and more preferably from about 25 to about 40 percent by weight.

The dibasic ester constituent of the present invention is at least one $C_1$–$C_4$ dialkyl ester of at least one $C_4$–$C_6$ aliphatic dibasic acid. Generally, the dibasic ester constituent will be a mixture of at least two and typically three $C_4$–$C_6$ aliphatic dibasic acid esters. Mixtures of $C_4$–$C_6$ aliphatic dibasic acids are a byproduct from the manufacture of adipic acid and the esters are afforded by the esterification of the byproduct stream. Although the composition of such a byproduct stream varies considerably, generally it is composed of 15 to about 30 percent succinic acid, from about 50 to about 73 percent glutaric acid and from about 6 to about 25 percent adipic acid. Although the ethyl, propyl and butyl esters are useful, the methyl esters are typically the most economically attractive and, consequently, preferred. Dibasic esters within the scope of the present invention are commercially available from E. I. DuPont de Nemours and Company, Wilmington, Del., U.S.A. or can be prepared by methods known to those skilled in the art.

The dibasic ester constituent is generally used in the composition of the present invention at from about 11 to about 32 percent by weight, preferably from about 15 to about 28.

The propylene glycol and glycol ether constituent of the present invention is at least one of propylene glycol, polypropylene glycol oligomers or monoalkyl ether or monophenyl ether derivatives of said glycols and oligomers. The glycol oligomers are polymers consisting of two, three or four propylene oxide monomer units terminated at each end with a hydroxy group. The monoalkyl ether derivatives have one to four carbon atoms in the alkyl moiety. Preferably tripropylene glycol monomethyl ether is used. The amount of propylene glycol or glycol ether used in the composition, generally is from about 4 to about 20 percent by weight, preferably from about 7 to about 15. These materials are commercially available or can be prepared by procedures known to those skilled in the art.

Both the type and amount of hydroxypropyl cellulose thickener are important to afford an effective, substantially stable water-based composition. "Substantially stable" should be understood as meaning the composition will remain substantially homogenous and not separate into visible or visually observable layers for at least 72 hours, preferably about 96 hours, upon standing undisturbed and, should layering occur, will readily return to a homogenous state with gentle shaking by hand. This stability is, of course, one measure of the shelf life of a coating remover. The cellulose thickener useful in the present invention is hydroxypropyl methylcellulose. Certain other thickening agents are unsatisfactory for one reason or another generally relating to effectiveness or stability. A particularly preferred hydroxypropyl methyl cellulose is commercially available from the Dow Chemical Company under the name METHOCELL® 311. The amount of cellulose thickener present in the composition of the present invention, that is, an effective amount, generally, is from about 0.35 percent by weight to about 1.15 percent by weight, preferably from about 0.5 percent by weight to about 1.0 percent by weight. When hydroxypropyl methylcellulose is present in the concentrate below these levels, significant loss of stability occurs; and when present above these levels, manufacture of the concentrate becomes more difficult and will increase the cost of the product.

There are no special requirements for the water and tap, well, deionized, bottled, distilled, etc., may be used without significant impact on effectiveness or stability of the water-based formulation. Generally, based on the total weight of the composition, the water will be present at from about 25 to about 65 percent by weight, preferably from about 30 to about 50 percent by weight. As the amount of water is decreased, the cost of the water-based formulation increases commensurately.

As stated above, a concentrate comprising N-methyl-2-pyrrolidone, dibasic ester, propylene glycol, polypropylene glycol oligomer and monoalkyl ether or monophenyl ether derivatives of said glycols and oligomers can be prepared without including water as a constituent. Such concentrates contain N-methyl-2-pyrrolidone from about 20 to about 77 parts by weight; dibasic ester at from about 13 to about 53 parts by weight; propylene glycol or glycol ether at from about 5 to about 33 parts by weight; and hydroxypropyl cellulose thickener at from about 0.4 to about 2.0 parts by weight. Although such concentrates can be used as an effective paint stripper, they are economically less attractive than the water-based compositions.

The concentrates of the present invention can be made free of water or contain any desired amount of water up to less than about 25 percent by weight of water which is a convenient form for shipping and also less costly. Preferably, these concentrates will contain from about 10 to about 20 percent by weight of water to increase fluidity and provide ease of blending at the time of use. As pointed out, the concentrates will be diluted with a suitable amount of water at the time of use to afford a water-based composition having the stated amount of water, which is from about 25 to about 65 percent by weight. By blending water at the time of use, the concentrate can be stored and transported in a space-saving manner and only the desired amount need be prepared for each use.

By "effective paint stripper" as used in this specification and claims is meant that the formulation will remove a coating from a substrate within a certain period of time. The time will vary depending on factors such as the type of coating, the number of coats and other factors known to those skilled in the art.

In order to obtain the maximum performance at the lowest cost, the water should constitute, as stated above, generally from about 25 percent by weight to about 65 percent by weight of the water-based formulation, preferably from about 30 to about 50 percent by weight.

Optionally, a surfactant may be included in the concentrates and water-based formulations of the present invention. The surfactants useful in the practice of this invention can be any water soluble nonionic, anionic amphoteric, or nonionic wetting agent type, or combinations thereof. When included in the concentrates and water-based compositions of the present invention, preferably nonionic surfactants are used at from about 0.7 to about 5.7 percent by weight in the concentrates and from about 0.5 to about 2.0 percent by weight in the water-based compositions.

The surfactants are commercially available or can be prepared by techniques known to those skilled in the art.

To obtain a substantially stable and homogenous blend of constituents, when present, the surfactant should be used at from about 0.4 to about 6 parts by weight based on the total weight of the concentrate. This corresponds to from about 0.3 to about 2.0 percent by weight based on the total weight of the water-based formulation, preferably, about 0.5 to about 1.5 percent by weight.

Generally, the concentrate is prepared at ambient temperature by admixing the dibasic ester and the NMP and then adding the hydroxypropyl cellulose thickener. This mixture is then blended until the thickener is thoroughly dissolved. Mixing is continued as the remaining constituents are added. The propylene glycol or glycol ether is added next and water is added last. Generally, the water-based composition is water clear and may have a tint of yellow color with a high viscosity.

The following examples will further illustrate the present invention but are not intended to limit it in any way. By substantially following the procedures described herein, the concentrate and water-based formulations of the present invention are obtained.

The water-based coating remover compositions were evaluated for their stability and effectiveness. The effectiveness of the water-based coating remover compositions are evaluated by placing about four drops on a previously coated piece of wood. After a predetermined period of time, the coating remover composition was wiped off with one wipe of a paper towel followed by two (2) scrapes with a plastic putty knife while exerting a small amount of pressure.

EXAMPLE 1

Step A

A coating remover composition is prepared from the following constituents:

| Constituent | Amount (parts by weight) |
| --- | --- |
| N-methyl-2-pyrrolidone | 32.0 |
| Dibasic ester (a mixture of about 17 percent dimethyl succinate, 17 percent dimethyl adipate, and 66 percent dimethyl glutarate, all percent by weight) | 22.0 |
| Hydroxyprogyl methylcellulose (Methocell ® 311) | 0.75 |
| Tripropylene glycol monomethylether | 10.0 |
| Distilled Water | 35.0 |

The N-methyl-2-pyrrolidone and dibasic ester are combined in a 250 ml beaker and mixed for about five (5) minutes. The hydroxypropyl methylcellulose is added and mixed slowly for about ten (10) minutes, or until a gel is afforded. To the gel, the tripropylene glycol monomethyl ether is added and mixed for about ten (10) minutes. The distilled water is added in 10 ml aliquots while mixing between each addition. All procedures are carried out at room temperature and speed of mixing is not important. The product has a high viscosity and is water clear with a tint of yellow color.

The order in which the constituents are added does not adversely impact the effectiveness or stability of the product composition.

EXAMPLE 2

To a 250 ml beaker containing distilled water, hydroxypropyl methylcellulose (Methocell®311) is slowly added while stirring, preferably at a slow speed. After all of the hydroxypropyl methylcellulose is added, continue mixing for about 15 minutes or until an off-white hazy gel is afforded. The NMP is added to the gel and mixed for about 10 minutes. The dibasic ester of Example 1 is then added and mixed for about 2 minutes. The tripropylene glycol monomethyl ether is added and mixed slowly for about 15 minutes. Slow mixing is important to afford a substantially homogenous product. The product was milky-white and less viscous than the product of Example 1.

This method of preparation is preferred when the formulation contains higher parts by weight of water.

The compositions of Examples 1 and 2 were evaluated for their stability and effectiveness.

EXAMPLE 3

Untreated white pine boards (2"×8") were sanded and wiped clean with a dry cloth. Three coats of oil-based alkyd spray paint were applied allowing 24 hours drying time between each coat. The bottom or first coat was a green tallow oil alkyd spray paint. The middle or second coat was a brown tallow oil alkyd spray paint and the top or third coat was the same green spray paint as the bottom coat.

A small amount, about four drops, or enough to afford a spot about 2 cm in diameter, of a composition prepared according to Example 1 was applied to the oil-based alkyd coated wood about two months after applying the third coat of paint. The stripping composition was allowed to remain undisturbed for 45 minutes. Substantially all three layers of paint were removed.

EXAMPLE 4

Pressure treated wood (2"×10") was sanded, then wiped clean with a dry cloth. One coat of white epoxy spray paint was applied. Four days later, the surface of the white epoxy was lightly sanded and then wiped clean with a dry cloth. A coat of coffee brown epoxy spray paint was applied.

A small amount, about four drops, or enough to afford a spot about 2 cm in diameter, of a composition as prepared according to Example 1 was applied to the epoxy paint coated wood about one month after applying the second coat of paint. The stripping composition was allowed to remain undisturbed for about 60 minutes. Substantially all of both layers of paint were removed.

EXAMPLE 5

Untreated white pine (2"×8") was sanded and wiped clean with a dry cloth. One coat of gloss white acrylic latex gloss enamel was applied using a polyester bristle brush. About 26 hours later, the surface of the white gloss enamel was lightly sanded and then wiped clean with a dry cloth. One coat of azure blue acrylic latex gloss enamel was then applied with a polyester bristle brush.

About one month after applying the second coat of acrylic latex gloss enamel, a small amount, about four drops or enough to afford a spot about 2 cm in diameter, of a composition prepared according to Example 1 was applied. The remover composition was allowed to remain undisturbed for 60 minutes. Substantially all of both coats of paint were removed.

EXAMPLE 6

Untreated white pine (2"×6") was sanded and wiped clean with a dry cloth. One coat of autumn brown polyurethane gloss enamel was applied with a brush. About 26 hours later, the brown polyurethane was lightly sanded and wiped clean with a dry cloth. One coat of gloss white polyurethane gloss enamel was applied with a brush.

A small amount, about four drops or enough to afford a spot about 2 cm in diameter, of a composition prepared according to Example 1 was applied to the polyurethane gloss enamel coated wood about one month after applying the second coat. The stripping composition was allowed to remain undisturbed for 60 minutes. Substantially all of both layers of paint were removed.

EXAMPLE 7

Untreated white pine (2"×6") was sanded and wiped clean with a dry cloth. A single coat of high gloss dark oak polyurethane varnish stain was applied with a brush. About 26 hours later, the urethane stain was lightly sanded and then wiped clean with a dry cloth. A single coat of clear high gloss polyurethane was applied with a brush.

About one month after the clear polyurethane was applied, a small amount, about four drops or enough to afford a spot about 2 cm in diameter, of a composition prepared according to Example 1 was applied. The stripping composition was allowed to remain undisturbed for 60 minutes. Substantially all of both layers of coating were removed.

In each of Examples 3, 4, 5, 6, and 7, no observable swelling of the wood occurred.

EXAMPLES 8 THROUGH 12

The procedures described in each of Examples 3, 4, 5, 6 and 7 were substantially followed except that a composition prepared according to Example 2 was applied to the variously coated wood samples. Substantially the same results are obtained, both in terms of time of removal to bare wood, and no observable swelling of the wood.

EXAMPLE 13

A composition prepared substantially in accordance with Example 1 was subjected to five cycles to evaluate the stability of that composition. Each cycle consisted of placing the composition in a freezer with a temperature of −15° C. for a time sufficient to allow the composition to acclimate to the freezer's temperature, then removing the composition to ambient temperature for a time sufficient to allow the composition to acclimate to ambient temperature. No observable separation or other break-down of the composition occurred. The composition was observed to become milky-white, but remain a viscous liquid at −15° C.

After each cycle, the composition was evaluated substantially according to the procedures described in each of Examples 3, 4, 5, 6, and 7. No difference in coating remover effectiveness as compared to a non-frozen composition was observed for any of the various coatings.

EXAMPLE 14

Substantially the same procedures described in Example 13 were repeated except that a composition prepared substantially in accordance with Example 2 is used.

No observable separation or other adverse impact to the composition occurred. No difference in coating remover effectiveness as compared to a non-frozen composition was observed for any of the various coatings.

EXAMPLE 15

A composition prepared substantially in accordance with Example 1 was subjected to two cycles of lowering the temperature of the composition to −38° C. and maintaining the composition at that temperature for about 3 hours, then allowing the composition to return to ambient temperature. An acetone/dry ice bath was used to achieve the low temperature.

No observable separation or other adverse impact to the composition occurred. After each cycle the composition was evaluated substantially according to the procedures described in each of Examples 3, 4, 5, 6 and 7. No difference in coating remover effectiveness, as compared to a nonfrozen composition was observed for any of the various coatings.

EXAMPLE 16

Substantially the same procedures described in Example 15 were repeated except that a composition prepared substantially in accordance with Example 2 is used.

No observable separation or other adverse impact to the composition occurred. No difference in coating remover effectiveness, as compared to a non-frozen composition was observed for any of the various coatings.

EXAMPLE 17

Two samples of a composition prepared substantially according to Example 1 in tightly capped glass bottles were placed in a circulating air oven at a temperature of 55° C. One sample had a nitrogen blanket over it, and the second sample did not. Both samples were kept in the oven for 24 hours, then removed.

No observable separation or other adverse impact to the composition occurred. Both compositions were then evaluated for their paint removal effectiveness substantially according to the procedures described in each of Examples 3, 4, 5, 6, and 7. No difference in coating remover effectiveness, as compared to a non-heated composition, was observed for any of the various coatings.

EXAMPLE 18

Substantially the same procedures described in Example 17 were repeated except that a composition prepared substantially in accordance with Example 2 is used.

No observable separation or other adverse impact to the composition occurred. No difference in coating remover effectiveness, as compared to a non-heated composition was observed for any of the various coatings.

EXAMPLE 19

Compositions are prepared substantially according to the procedures in Example 1 except that 0.8 percent by weight of a surfactant is added to the composition, the surfactants added are set forth in Table I.

Each of the 8 surfactant containing compositions was evaluated for its coating removal effectiveness substantially according to the procedures described in each of Examples 3, 4, 5, 6 and 7. No observable separation or difference in coating remover effectiveness over a nonsurfactant containing composition was seen.

TABLE I

| Example No. | Surfactant |
| --- | --- |
| 19A | Amphoteric, TEGO Betaine L-90[1] |
| 19B | Amphoteric, TEGO Betaine S[1] |
| 19C | Anionic, sodium dodecyl sulfate |
| 19D | Nonionic, PLURONIC® L-101[2] |
| 19E | Nonionic, ICONOL® NP-9[2] |
| 19F | Nonionic, NEODOL® 25-3[3] |
| 19G | Nonionic, NEODOL® 25-7[3] |
| 19H | Nonionic wetting agent, SURFYNOL® 61[4] |

[1]Goldschmidt Chemical Corporation, 914 Randolph Road, P.O. Box 1299, Hopewell, VA 23860.
[2]BASF Corporation, 100 Cherry Hill Road, Parsippany, NJ, Shell Chemical Company, P.O. Box 2463, 1 Shell Plaza, Houston, TX 77002
[3]Air Products & Chemicals, Inc., Allentown, PA 18195

COMPARATIVE EXAMPLE

A composition was prepared substantially according to the procedures of Example 1. Another composition (hereinafter Example A) was prepared from the following constituents:

| Constituent | Amount (parts by weight) |
| --- | --- |
| Aromatic 100 | 46.56 |
| N-methyl-2-pyrrolidone | 25.18 |
| Hydroxypropyl methylcellulose | 0.78 |
| Tripropylene glycol methylether | 26.44 |
| Monoethanol amine | 1.04 |

The hydroxypropyl methylcellulose thickener (Methocell® 311) is dissolved in a mixture of NMP and aromatic and blended using a propeller type axial flow mixer under low shear conditions until no thickener particles are observable, about one hour at room temperature. The blending speed was adjusted to ensure good particle mixing with an observable depression but not so high as to create a deep vortex cavity. The glycol ether is then rapidly added with continued blending. The monoethanol amine was then added with continued blending until a substantially homogenous mixture was obtained. An equal part of tap water Wyandotte, Mich. municipal water was then added, with low-shear blending as described above, until a substantially homogenous mixture was afforded. Example A is described in Example 1 of U.S. application Ser. No. 235,591 filed Aug. 24, 1988.

Examples 1 and A were applied with a paint brush on the surface of a mahogany table having 2 layers of lacquer. The top coat was a wood-grain printed lacquer and the bottom coat was a 2–3 mil thick tan colored lacquer. Observations were made after 20 minutes, 1 hour and 13 hours. The results are set forth in Table II.

TABLE II

| Time | Example 1 | Example A |
| --- | --- | --- |
| 20 minutes | Total penetration and dissolving of top layer; penetration and softening total thickness of second layer. Wiping with a damp cloth and minimal sanding (150 grit) left bare wood. | Minimal penetration into top layer and no penetration into second layer. |
| 1 hour | No substantial change from status at 20 minutes. | No substantial change from status at 20 minutes. |
| 13 hours | No substantial change from status at 20 minutes. | Tacky Film had formed that was difficult to scrape off. (Film had formed after about 3 hours). |

It should be understood that the present specification and claims are set forth by way of illustration and not limitation and that various modifications and changes may be made without departing from the spirit and scope of the present invention as defined by the appended claims.

The embodiments of the invention in which an exclusive privilege or property is claimed are defined as follows:

1. A substantially stable homogenous water-based, amine activator-free, clear coating remover composition consisting essentially off (a) from about 16 to about 55 percent by weight of N-methyl-2-pyrrolidone;

(b) from about 11 to about 32 percent by weight of at least one dialkyl ester of at least one $C_{4-6}$ aliphatic dibasic acid;

(c) from about 4 to about 20 percent by weight of a propylene glycol or glycol ether;

(d) an effective amount of a hydroxypropyl cellulose thickener; and (e) from about 25 to about 50 percent by weight water.

2. A composition according to claim 1 including from about 0.5 to about 2.0 percent by weight of a surfactant.

3. A composition according to claim 1, wherein said N-methyl-2-pyrrolidone is present at from about 20 to about 45 percent by weight.

4. A composition according to claim 1, wherein (b) is present at from about 15 to about 28 percent by weight.

5. A composition according to claim 1, wherein said propylene glycol or glycol ether is tripropylene glycol mono($C_1$–$C_4$)alkyl ether.

6. A composition according to claim 5, wherein said tripropylene glycol mono($C_1$–$C_4$)alkyl ether is tripropylene glycol monomethyl ether.

7. A composition according to claim 1, wherein said glycol ether is present at from about 7 to about 15 percent by weight.

8. A composition according to claim 1, wherein said hydroxypropyl cellulose thickener is hydroxypropyl methylcellulose.

9. A composition according to claim 8, wherein said hydroxypropyl methylcellulose is present at from about 0.5 to about 1.0 percent by weight.

10. A composition according to claim 1, wherein said water is present at from about 30 to about 50 percent by weight.

11. A substantially stable homogenous water-based, amine activator-free, coating remover concentrate consisting essentially of:

(a) from about 20 to about 82 parts by weight of N-methyl-2-pyrrolidone;

(b) from about 13 to about 53 parts by weight of at least one $C_{1-4}$ dialkyl ester of at least one $C_{4-6}$ aliphatic dibasic acid;

(c) from about 5 to about 33 parts by weight of a propylene glycol or glycol ether;

(d) an effective amount of a hydroxypropyl cellulose thickener; wherein water is blended with the coating remover concentrate in an amount of less than about 25 parts by weight to form a substantially stable homogenous water-based coating remover composition.

12. The concentrate of claim 11 further including from about 0.7 to about 5.7 percent by weight of a surfactant.

13. The concentrate of claim 11 wherein said propylene glycol or glycol ether is tripropylene glycol mono($C_1$–$C_4$) alkyl ether.

14. The concentrate of claim 13 wherein said tripropylene glycol mono($C_1$–$C_4$) alkyl ether is tripropylene glycol monomethyl ether.

15. The concentrate of claim 11 wherein said hydroxypropyl cellulose thickener is hydroxypropyl methylcellulose.

16. A clear water-based composition for stripping paint from a wood substrate consisting essentially of:
    (a) N-methyl-2-pyrrolidone in an amount from about 16 to about 55 percent by weight;
    (b) a dibasic ester in an amount from about 11 to about 32 percent by weight;
    (c) tripropylene glycol monomethyl ether in an amount from about 4 to about 20 percent by weight;
    (d) hydroxypropyl methylcellulose in an amount between about 0.35 to about 1.15 percent by weight; and
    (e) up to about 50%.

17. The paint-stripping composition as in claim 16, a surfactant in an amount from about 0.5 to about 2.0 percent by weight.

18. The paint-stripping composition as in claim 16, wherein said N-methyl-2-pyrrolidone is present from about 20 to about 45 percent by weight.

19. The paint-stripping composition as in claim 16, wherein said dibasic ester is present from about 15 to about 28 percent by weight.

20. The paint-stripping composition as in claim 16, wherein said hydroxypropyl methylcellulose is present from about 0.5 to about 1.0 percent by weight.

* * * * *